(12) United States Patent
Ishiguro et al.

(10) Patent No.: US 8,298,660 B2
(45) Date of Patent: Oct. 30, 2012

(54) FLAME-RETARDANT POLYOLEFIN RESIN COMPOSITION AND ADHESIVE TAPE SUBSTRATE COMPOSED OF THE COMPOSITION, AND ADHESIVE TAPE

(75) Inventors: Shigeki Ishiguro, Ibaraki (JP); Takahiro Yatagai, Ibaraki (JP); Tomohito Harada, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 504 days.

(21) Appl. No.: 12/078,931

(22) Filed: Apr. 8, 2008

(65) Prior Publication Data

US 2010/0286320 A1 Nov. 11, 2010

(30) Foreign Application Priority Data

Apr. 17, 2007 (JP) ................................. 2007-108278

(51) Int. Cl.
*B32B 7/12* (2006.01)
(52) U.S. Cl. ........ 428/343; 524/430; 524/431; 524/432; 524/433; 524/434; 524/435; 524/436; 524/437; 524/438; 524/439; 524/440; 524/441
(58) Field of Classification Search .................. 428/343; 524/430–441
See application file for complete search history.

(56) References Cited

U.S. PATENT DOCUMENTS

| | | | |
|---|---|---|---|
| 5,462,987 A * | 10/1995 | Shinonaga et al. ........... 524/451 |
| 5,561,185 A | 10/1996 | Hashimoto et al. |
| 6,218,454 B1 | 4/2001 | Nosu et al. |
| 6,232,377 B1 | 5/2001 | Hayashi et al. |
| 6,586,090 B2 | 7/2003 | Nakagawa et al. |
| 6,773,806 B1 | 8/2004 | Nakagawa et al. |
| 2002/0099141 A1 | 7/2002 | Sato et al. |
| 2002/0161093 A1* | 10/2002 | Nakashima et al. .......... 524/436 |
| 2003/0175512 A1 | 9/2003 | Ishiguro et al. |
| 2005/0032961 A1 | 2/2005 | Oguni et al. |
| 2006/0155047 A1 | 7/2006 | Ishiguro et al. |
| 2009/0264573 A1* | 10/2009 | Maeda ........................ 524/436 |

FOREIGN PATENT DOCUMENTS

| | | |
|---|---|---|
| JP | 05-047249 | 2/1993 |
| JP | 05-194915 | 8/1993 |
| JP | 11-29663 | 2/1999 |
| JP | 11-116828 | 4/1999 |
| JP | 11-279411 | 10/1999 |
| JP | 2000-169799 | 6/2000 |
| JP | 2001-131509 | 5/2001 |
| JP | 2001-164215 | 6/2001 |
| JP | 2001-312925 | 11/2001 |
| JP | 2002-163940 | 6/2002 |
| JP | 2002-167483 | 6/2002 |
| JP | 2002-212356 | 7/2002 |
| JP | 2003/178628 | 6/2003 |
| JP | 2003-217356 | 7/2003 |
| JP | 2003-219533 | 7/2003 |
| JP | 2004-115714 | 4/2004 |
| JP | 2004156026 A * | 6/2004 |
| WO | 2004/113439 A1 | 12/2004 |

OTHER PUBLICATIONS

Notice of Reasons for Refusal mailed Mar. 13, 2012 in corresponding Japanese Patent Application No. 108278/2007, with English translation.
Notice of Reasons for Refusal dated Dec. 14, 2011 in corresponding Japanese Patent Application No. 108278/2007, with English translation.

* cited by examiner

*Primary Examiner* — Peter D Mulcahy
(74) *Attorney, Agent, or Firm* — Wenderoth, Lind & Ponack, L.L.P.

(57) ABSTRACT

The present invention provides a flame-retardant polyolefin resin composition having superior molding processability, a resistance to thermal deformation and suitable stretchability and intensity, which is rich in elastic deformation. The present invention provides a flame-retardant polyolefin resin composition comprising component A (a thermoplastic resin having a carbonyl oxygen atom in the molecular skeleton), component B (a polymer alloy containing an ethylene component and a propylene component), component C: a modified polyolefin polymer containing an acidic functional group and having a weight average molecular weight of 10,000-80,000 and component D (an inorganic metal compound), and substantially free of a halogen atom.

6 Claims, 2 Drawing Sheets

FLAME-RETARDANT POLYOLEFIN RESIN COMPOSITION AND ADHESIVE TAPE SUBSTRATE COMPOSED OF THE COMPOSITION, AND ADHESIVE TAPE

TECHNICAL FIELD OF THE INVENTION

The present invention relates to a flame-retardant polyolefin resin composition, an adhesive tape substrate composed of the composition, and an adhesive tape. In particular, the present invention relates to a flame-retardant polyolefin resin composition superior in metal release performance (releasability from metal) and molten flowability, which is capable of affording a molded product in a desired shape without impairing the appearance and capable of affording a flame-retardant molded product having good heat resistance and good mechanical properties.

BACKGROUND OF THE INVENTION

Conventionally, adhesive tapes comprising a tape substrate (hereinafter to be also simply referred to as a substrate) composed of polyvinyl chloride (hereinafter to be referred to as PVC) have been widely used as insulating tapes for electric equipment used in the fields of vehicles (e.g., automobile, train, bus and the like), aircraft, ship, house, plant and the like because they are superior in mechanical properties (particularly flexibility and stretchability), flame resistance, resistance to thermal deformation, electrical insulation and the like, and relatively economical. Particularly, adhesive tapes to be wound around wire harness used for electric wires in automobile and the like, coils for household electric appliances, and electric wires and the like are required to show high flame resistance (oxygen index of not less than 25%) and high resistance to thermal deformation. To meet such requirements, adhesive tapes using PVC as a substrate have been widely used.

Under the circumstances, a number of substrates for adhesive tape (alternative technique), which use a relatively flexible olefin resin, have been considered instead of flexible PVC suspected of generating a harmful gas. To confer flame resistance, however, addition of a large amount of a flame retardant is necessary since polyolefin resins are flammable by nature. Considering the environmental aspects, in particular, inorganic metal compounds such as metal hydrate and the like are often added, since they produce highly safe combustion gas. To achieve high flame retardancy, however, a large amount of an inorganic metal compound needs to be added, which in turn produced problems such as lower mechanical properties, impaired appearance, degraded processability and like.

As to the lower mechanical properties, the Applicant of the present application proposed a method of suppressing the degradation of mechanical properties, which includes treating the surface of an inorganic metal compound with a silane coupling agent and adding a thermoplastic resin containing a carbonylic oxygen atom in the molecular skeleton of EVA and the like (JP-A-2001-311061). Moreover, the Applicant proposed a method of further enhancing the mechanical properties by adding a salicylic acid compound. In this method, an aminosilane treatment was most effective among silane coupling treatments (JP-A-2006-193565).

However, since these methods require a silane coupling treatment, compositions problematically show poor metal release property (i.e., releasability from metal) and significantly impair the processability. Moreover, since the silane coupling treatment reduces the flowability of resin compositions, it problematically degrades the appearance of molded products. In particular, an aminosilane treatment significantly degrades the processability.

Examples of the method for enhancing the resistance to thermal deformation of this kind of resin composition include a method comprising irradiation of ionization radiation, a method comprising forming a crosslinking structure by adding a crosslinking agent such as an organic peroxide and the like (e.g., di-cumyl peroxide and the like) in advance to a resin composition and applying vapor heating and the like after molding, and the like. These methods problematically increase the number of production steps and production costs, and therefore, are difficult for practical application.

SUMMARY OF THE INVENTION

The present invention has been made in view of the above-mentioned situation and the problem to be solved is to provide a flame-retardant polyolefin resin composition capable of affording a flame-retardant molded product superior in molding processability and having a good appearance.

In addition, the problem is to provide a flame-retardant polyolefin resin composition having superior molding processability, resistance to thermal deformation and suitable stretchability and intensity, which is rich in elastic deformation.

Moreover, the problem is to provide an adhesive tape substrate capable of providing an adhesive tape having high flame-retardancy, good wrapping workability, good binding performance, good hand-tearability and good appearance.

The present inventors have conducted intensive studies in an attempt to solve the aforementioned problems and found that a composition comprising a relatively low molecular weight modified polyolefin polymer comprising (A) a polymer alloy containing an ethylene component and a propylene component, (B) a thermoplastic resin having a carbonyl oxygen atom in the molecular skeleton, and (C) a modified polyolefin polymer containing an acidic functional group and having a weight average molecular weight of 10,000-80,000, and (D) an inorganic metal compound is superior in metal release property and molten flowability, and can provide a flame-retardant molded product in a desired shape without impairing the appearance, and that it can be a resin composition having a superior resistance to thermal deformation, suitable stretchability and intensity, which is free of a yield point and rich in elastic deformation, based on which findings to further studied and completed the present invention.

Accordingly, the present invention provides the following.
(1) A flame-retardant polyolefin resin composition comprising the following components A-D and substantially free of a halogen atom:
   component A: a thermoplastic resin having a carbonyl oxygen atom in the molecular skeleton
   component B: a polymer alloy containing an ethylene component and a propylene component
   component C: a modified polyolefin polymer containing an acidic functional group and having a weight average molecular weight of 10,000-80,000
   component D: an inorganic metal compound.
(2) The flame-retardant polyolefin resin composition of the above-mentioned (1), wherein the acidic functional group of the component C is an acid anhydride group.
(3) The flame-retardant polyolefin resin composition of the above-mentioned (1) or (2), wherein the component C has an acid value of 10-80 mg KOH/g.

(4) The flame-retardant polyolefin resin composition of any of the above-mentioned (1)-(3), wherein the inorganic metal compound of the component D is a metal hydroxide.
(5) The flame-retardant polyolefin resin composition of any of the above-mentioned (1)-(4), wherein the mixing weight ratio of component A, component B and component C (component A:component B:component C) is 10-60:89-30:1-10.
(6) The flame-retardant polyolefin resin composition of any of the above-mentioned (1)-(5), comprising 20-200 parts by weight of component D per 100 parts by weight of the total amount of component A, component B and component C.
(7) A molded product of the flame-retardant polyolefin resin composition of any of the above-mentioned (1)-(6), which is not crosslinked during or after a forming process thereof.
(8) An adhesive tape substrate composed of the molded product of the above-mentioned (7).
(9) An adhesive tape using the adhesive tape substrate, of the above-mentioned (8).
(10) The adhesive tape of the above-mentioned (9), having a thermal deformation rate of not more than 65% at 100° C.

According to the present invention, a flame-retardant polyolefin resin composition having excellent molding processability can be attained that enables a flame-retardant molded product with a good appearance to be obtained. In particular, a flame-retardant polyolefin resin composition can be attained that have excellent molding processability and resistance to thermal deformation, suitable stretchability and strength, and high elastic deformability.

The flame-retardant polyolefin resin composition of the present invention, since it has an excellent metal release property, can be shaped into a film having a good appearance by calendar molding with good operability, and by using the sheet (film) as the substrate of an adhesive tape, a flame-retardant adhesive tape can be obtained that has a good appearance and excellent winding workability, binding performance and hand-tearability.

BRIEF DESCRIPTION OF THE DRAWING

In the Figures, 1 is a round bar, 2 is a loading plate, 2a is a convex, 3 is a parallel plate, 10 is a test sample, T is an adhesive tape, 11 is a calendar roll (roll No. 1), 12 is a calendar roll (roll No. 2), 13 is a calendar roll (roll No. 3), 14 is a calendar roll (roll No. 4), and 15-17 are banks.

DETAILED DESCRIPTION OF THE INVENTION

The embodiment of the present invention is explained in detail in the following.

The flame-retardant polyolefin resin composition of the present invention (hereinafter to be simply referred to as "the resin composition of the present invention") characteristically contains the following component A-component D and is substantially free of a halogen atom:
Component A: a thermoplastic resin having a carbonyl oxygen atom in the molecular skeleton
Component B: a polymer alloy containing an ethylene component and a propylene component
component C: a modified polyolefin polymer containing an acidic functional group and having a weight average molecular weight of 10,000-80,000
component D: an inorganic metal compound.

As used herein, by the "substantially no halogen atom" is meant non-use of a substance having a halogen atom in a molecule as a constituent element of a composition (constituting material). However, a halogen atom detected in an ultra-trace amount by the analysis of a molded product of the resin composition of the present invention (e.g., ultra-trace amount of a halogen atom detected from a molded product, which results from mixing of a halogen atom derived from a halogen-containing substance used as a catalyst for the synthesis of a constituent component (constituting material) of a composition) using a mechanical analysis method is excluded.

Due to such constitution, the flame-retardant polyolefin resin composition of the present invention is superior in the molding processability and can afford a molded product with a good appearance, particularly, a film (sheet) having a small surface roughness and a good appearance can be formed by calendar molding. In addition, since the composition has superior resistance to thermal deformation, and suitable stretchability and intensity, as well as elastic deformation without yield point, a film (sheet) obtained by molding is particularly preferable as a substrate of adhesive tapes.
[Component A]
The "thermoplastic resin having a carbonyl oxygen atom (oxygen atom attributable to carbonyl group) in the molecular skeleton" of Component A mainly imparts flexibility and stretchability to a composition. In addition, it further activates a flame resistance-imparting action of an inorganic metal compound. Particularly, a soft polyolefin resin having a carbonyl oxygen atom in the molecular skeleton and the like are preferable.

The soft polyolefin resin having a carbonyl oxygen atom in the molecular skeleton may be an ethylene copolymer or a metal salt thereof (ionomer) comprising a vinyl ester compound and/or an $\alpha,\beta$-unsaturated carboxylic acid or a derivative thereof as a monomer or a comonomer. In general, it has a melting point of not more than 100° C., preferably 40-100° C. The melting point is measured by a differential scanning calorimeter (DSC).

In the above-mentioned ethylene copolymer or a metal salt thereof (ionomer), the vinyl ester compound may be, for example, lower alkyl ester of vinyl alcohol such as vinyl acetate, vinyl propionate, vinyl butyrate and the like. The $\alpha,\beta$-unsaturated carboxylic acid or a derivative thereof may be, for example, unsaturated carboxylic acids and anhydrides thereof, such as acrylic acid, methacrylic acid, maleic acid, fumaric acid, maleic anhydride, itaconic anhydride and the like; unsaturated carboxylates such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, stearyl acrylate, stearyl methacrylate, lauryl acrylate, lauryl methacrylate, monomethyl maleate, monoethyl maleate, diethyl maleate, monomethyl fumarate, glycidyl acrylate and glycidyl methacrylate; and the like. Of these, alkyl(meth)acrylate, particularly ethyl acrylate, is preferable.

Examples of suitable ethylene copolymer or a metal salt thereof (ionomer) include ethylene-acrylic acid copolymer, ethylene-methacrylic acid copolymer, ethylene-ethyl acrylate copolymer, ethylene-acrylic acid-ethyl acrylate copolymer, ethylene-vinyl acetate copolymer, ethylene-vinyl acetate-ethyl acrylate copolymer, ethylene-glycidyl methacrylate copolymer, ethylene-glycidyl methacrylate-ethyl acrylate copolymer and metal salts thereof (ionomers) and the like, which may be used alone or in combination. Of these, from the aspects of flexibility, metal release property and the like of a composition, ethylene-vinyl acetate copolymer, ethylene-ethyl acrylate copolymer and the like are particularly preferable, and ethylene-vinyl acetate copolymer is especially preferable. In addition, an ethylene-vinyl acetate copolymer has, from the aspects of flexibility, metal release property and flame resistance of a composition, a vinyl acetate content (copolymerization amount) of preferably 10-50 wt %, more preferably 20-40 wt %.

[Component B]

The "polymer alloy comprising an ethylene component and a propylene component" of component B is an unmodified alloy of two or more kinds of polymers selected from a polymer containing ethylene as a main constituent unit, a polymer containing propylene as a main constituent unit, and a polymer containing ethylene and propylene as main constituent units, which is free of a treatment for introducing a functional group into a polymer chain after forming the alloy and the like.

The "polymer alloy comprising an ethylene component and a propylene component" of component B is an unmodified alloy of two or more kinds polymers selected from a polymer containing ethylene as a main constituent unit, a polymer containing propylene as a main constituent unit, and a polymer containing ethylene and propylene as main constituent units, which is free of a treatment for introducing a functional group into a polymer chain after forming the alloy and the like. The polymer alloy is a component mainly playing a role of preventing easy thermal deformation of the resin composition of the present invention, which generally has a melting point over 100° C.

Specific examples of the polymer alloy include a physical mixture or a block copolymer of not less than two kinds of polymers selected from the group consisting of (i) polypropylene, (ii) polyethylene, (iii) copolymer of ethylene and a small amount of other α-olefin, (iv) copolymer of ethylene and propylene, (v) terpolymer of propylene, ethylene and α-olefin other than these, and (vi) ethylene•propylene rubber (EPR).

The above-mentioned "polypropylene" means "homopolypropylene (h-PP)" and/or "random polypropylene", and "polyethylene" means a "homopolymer of ethylene" and/or "copolymer with ethylene and a little α-olefin". In addition, "the homo polypropylene (h-PP)" is meant a polymer comprising substantially 100% of polypropylene and "the random polypropylene" is meant a copolymer comprising several percent of ethylene randomly copolymerized.

Particularly preferable polymer alloy is, from the aspects of resistance to thermal deformation of a composition, polymer alloy of homopolypropylene (h-PP) and ethylene•propylene rubber (EPR), polymer alloy of random polypropylene and ethylene•propylene rubber (EPR), most preferably, a physical mixture of homopolypropylene (h-PP) and ethylene•propylene rubber (EPR).

In the present specification, α-olefin means 1-butene, 1-penten, 1-hexene, 4-methyl-1-pentene, 1-heptene, 1-octene and the like.

[Component C]

The "modified polyolefin polymer containing an acidic functional group and having a weight average molecular weight of 10,000-80,000" of component C mainly functions to act on the aforementioned component B ("polymer alloy containing an ethylene component and a propylene component") and the below-mentioned component D ("inorganic metal compound") to enhance the blending performance of them, enhance the property uniformity of the composition, and increase the elastic deformation of the composition. By the addition of the modified polyolefin polymer (i.e., by the co-presence of the modified polyolefin polymer and the below-mentioned component D ("inorganic metal compound")), the composition does not lose good metal release property since the molten tension of the composition increases during processing, and the molded product shows good elastic deformation free of a yield point. Examples of the acidic functional group in the modified polyolefin polymer include a carboxyl group, a carboxyl derivative group and the like, and a carboxyl derivative group is chemically derived from a carboxyl group. Examples of the derivative include an ester group, an amide group, an imide group, a cyano group and the like. When a low molecular weight polyolefin polymer free of acid modification is used instead of the modified polyolefin polymer, the metal release property is degraded since the molten tension of the composition decreases. In addition, the obtained molded product has a yield point and cannot show good elastic deformation.

The modified polyolefin polymer of the component C is obtained, for example, by grafting an unsaturated compound containing an acidic functional group on an unmodified polyolefin polymer.

Examples of the above-mentioned unmodified polyolefin polymer include polyolefins or oligomers thereof such as high density polyethylene, medium density polyethylene, low density polyethylene, propylene polymer, polybutene, poly-4-methylpentene-1, copolymer of ethylene and α-olefin, copolymer of propylene and α-olefin and the like; polyolefin elastomers such as ethylene-propylene rubber, ethylene-propylene-diene copolymer rubber, butyl rubber, butadiene rubber, low crystalline ethylene-propylene copolymer, propylene-butene copolymer, ethylene-vinyl ester copolymer, ethylene-methyl(meth)acrylate copolymer, ethylene-ethyl(meth)acrylate copolymer, ethylene-maleic anhydride copolymer, a blend of polypropylene and ethylene-propylene rubber and the like and a mixture of two or more kinds of these. Of these, preferred are a propylene polymer, a copolymer of propylene and α-olefin, low density polyethylene and oligomers thereof, and particularly preferred are a propylene polymer, a copolymer of propylene and α-olefin, and oligomers thereof. Examples of the oligomers conclude those obtained by a molecular weight degradation method by thermal decomposition or a polymerization method.

Examples of the above-mentioned unsaturated compound containing an acidic functional group include an unsaturated compound containing a carboxyl group, an unsaturated compound containing a carboxyl derivative group and the like, and examples of the unsaturated compound containing a carboxyl group include (anhydrous) maleic acid, (anhydrous) itaconic acid, chloro(anhydrous)itaconic acid, chloro(anhydrous)maleic acid, (anhydrous)citraconic acid, (meth)acrylic acid and the like. In addition, examples of the unsaturated compound containing a carboxyl derivative group include (meth)acrylic acid such as methyl(meth)acrylate, glycidyl (meth)acrylate, 2-hydroxyethyl(meth)acrylate and the like; vinyl cyanide such as (meth)acrylamide, maleimide and (meth)acrylonitrile and the like. Preferred are unsaturated compounds containing a carboxyl group (specifically, (anhydrous)maleic acid), and more preferred are unsaturated compounds containing an acid anhydride group (specifically, maleic anhydride).

It is important that the modified polyolefin polymer has a weight average molecular weight of 10,000-80,000, preferably 20,000-70,000, more preferably 25,000-60,000, as measured by GPC. Using a polymer having the weight average molecular weight, good molding processability and improvement of surface state of the composition become available.

In the modified polyolefin polymer, while the proportion of modification by an unsaturated compound containing an acidic functional group is not particularly limited, it is preferably about 2-15 wt %, more preferably 4-12 wt %, relative to the unmodified polyolefin polymer, from the aspect of easiness of production of the modified polymer.

In addition, the modified polyolefin polymer preferably has an acid value of 10-80 mg KOH/g, more preferably 20-60 mg KOH/g. Using a composition having an acid value within this range, a composition showing suitable stretchability and intensity, and rich elastic deformation, which is without a yield point, can be obtained, and particularly, mechanical property most suitable as a substrate of an adhesive tape can be obtained.

The modified polyolefin polymer of the component C can be obtained by reacting the above-mentioned unsaturated compound containing an acidic functional group with an unmodified polyolefin polymer in the presence of an organic peroxide. As the organic peroxide, those generally used as radical polymerization initiators can be used. For this reaction, any of a solution technique and a melting technique can be used. The solution technique includes dissolving a mixture of an unmodified polyolefin polymer and an unsaturated compound containing an acidic functional group together with organic peroxide in an organic solvent and heating the same. The reaction temperature is preferably about 110-170° C. The melting technique includes mixing a mixture of an unmodified polyolefin polymer and an unsaturated compound containing an acidic functional group with organic peroxide, and reacting the mixture by melt mixing. For the melt mixing, various blending machines such as an extruder, a bravender, a kneader, a banbury mixer, etc., and the like can be used, and the kneading temperature is generally within the range of from the melting point of the unmodified polyolefin polymer to 300° C.

The modified polyolefin polymer of the component C may be a commercially available product and, for example, "YOUMEX 1010" manufactured by Sanyo Chemical Industries, Ltd. (modified polypropylene containing a maleic anhydride group, acid number: 52 mg KOH/g, weight average molecular weight: 32,000, modified ratio: 10 wt %), "YOUMEX 1001" (modified polypropylene containing a maleic anhydride group, acid number: 26 mg KOH/g, weight average molecular weight: 49,000, modified ratio: 5 wt %), "YOUMEX 2000" (modified polypropylene containing a maleic anhydride group, acid number: 30 mg KOH/g, weight average molecular weight: 20,000, modified ratio: 5 wt %) and the like can be used.

[Component D]

The "inorganic metal compound" of component D is used as a flame-retardant. For example, metal hydroxides such as aluminum hydroxide, magnesium hydroxide; zirconium hydroxide, calcium hydroxide, barium hydroxide and the like; metal carbonates such as basic magnesium carbonate, magnesium-calcium carbonate, calcium carbonate, barium carbonate, dolomite and the like; metal hydrates (hydrates of metal compound) such as hydrotalcite, borax and the like; barium metaborate; magnesium oxide and the like can be mentioned. These can be used alone or in a combination of two or more kinds thereof. Of these, metal hydroxide is preferable and, of metal hydroxides, magnesium hydroxide is particularly preferable.

To enhance the interface binding force with a polymer, a smaller particle size of the inorganic metal compound is advantageous. However, the mechanical property tends to be degraded due to a dispersion failure, since a smaller particle size easily causes coagulation of particles. Accordingly, the particle size of the inorganic metal compound is generally about 0.05-50 μm, preferably about 0.1-20 μm, more preferably about 0.5-10 μm. The particle size is an average particle size of secondary particles measured by a laser diffraction method.

The inorganic metal compound used may be surface treated with a silane coupling agent. The silane coupling agent is a silane compound having a structure wherein an organic functional group having affinity for or reactivity with an organic resin is chemically bonded to a hydrolyzable silyl group having affinity for or reactivity with an inorganic material. Examples of the hydrolyzable group bonded to silicon include an alkoxy group, an acetoxy group and the like. Examples of the alkoxy group generally include a methoxy group and an ethoxy group. General examples of the organic functional group include an amino group, a methacryl group, a vinyl group, an epoxy group, a mercapto group and the like. Specific examples of the silane coupling agent include vinyl-triethoxysilane, vinyl-tris(2-methoxy-ethoxy)silane, γ-methacryloxypropyltrimethoxysilane, γ-aminopropyltrimethoxysilane, γ-aminopropyltriethoxysilane, N-phenyl-γ-aminopropyl-trimethoxysilane, N-β-(aminoethyl)-γ-aminopropyltrimethoxysilane, N-β-(aminoethyl)-γ-aminopropyltriethoxysilane, N-phenyl-γ-aminopropyltriethoxysilane, β-(3,4-epoxycyclohexyl)-ethyltrimethoxysilane, γ-glycidoxypropyltrimethoxysilane, γ-mercaptopropyltrimethoxysilane and the like, which may be used alone or in a combination of two or more kinds thereof.

The method of the surface treatment with a silane coupling agent is not particularly limited, and a typical method such as a dry treatment method, a wet treatment method and the like can be used. The attached amount of the silane coupling agent to the surface of an inorganic metal compound varies depending on the kind of the silane coupling agent, the kind of the inorganic metal compound and specific surface area. It is generally 0.1-5.0 wt %, preferably 0.3-3.0 wt %, per the weight of the inorganic metal compound.

The amount of addition of the inorganic metal compound of the component D is preferably 20-200 parts by weight, more preferably 50-150 parts by weight, relative to the polymer component of the composition, namely, per 100 parts by weight of the total amount of component A, component B and component C. In the preferable range, good molding processability, good surface state and good mechanical property can be obtained while conferring sufficient flame-retardancy.

In the resin composition of the present invention, the mixing weight ratio of component A, component B and component C (component A:component B:component C), 10-60:89-30:1-10 is preferable, and 20-50:77-42:3-8, is preferable. In such preferable ranges, the composition particularly remarkably shows good molding processability, good surface state and good tensile property, and can maintain resistance to thermal deformation at 100° C.

The resin composition of the present invention can use red phosphorus for the purpose of promoting char (char layer) of the inorganic metal compound (flame-retardant agent). When using red phosphorus, to prevent development of toxic phosphine even when heated in the presence of water (stabilization of red phosphorus surface), red phosphorus is preferably coated with a film of an inorganic metal compound, or a thermosetting resin (phenol resin etc.) coating is preferably applied doubly on the film of the inorganic metal compound before use. A char forming aid containing the red phosphorus is suitably used in a proportion of generally 2-10 parts by weight, preferably 4-8 parts by weight, per 100 parts by weight of the total amount of component A, component B and component C.

When using a char forming aid containing the red phosphorus, more preferable results can be obtained by concurrently using at least one member selected from carbon black, borates and silicone compounds (silicone oil, silicone rubber, silicone resin and the like). In this case, at least one kind selected from carbon black, borate and silicone compound is suitably used in a proportion of generally 0.5-10 parts by weight, preferably 1-5 parts by weight, per 100 parts by weight of the total amount of component A, component B and component C.

The resin composition of the present invention may contain, besides the above-mentioned components A-D, an inorganic filler such as titanium oxide, zinc oxide and the like, an age resister and antioxidant such as amine type, quinoline type, hydroquinone type, phenol type, phosphorous type and phosphate-type age resisters and the like, an ultraviolet absorber such as salicylic acid derivative, benzophenone type, benzotriazole type and hindered amine type ultraviolet absorbers and the like, a lubricant, a plasticizer and the like as necessary.

The resin composition of the present invention is prepared by dry blending the above-mentioned components A-D and an additive added as necessary, and melt-kneading the mixture by, for example, a banbury mixer, a roll, an extruder and the like. The conditions of melt-kneading are not particularly limited, and can be performed under appropriate conditions affording a uniformly dispersed blend. In the case of a banbury mixer, for example, the melt-kneading is performed at a temperature range of 160-200° C. for about 3-15 min so that a uniformly dispersed blend can be afforded.

The resin composition of the present invention is flexible and has superior resistance to thermal deformation, sufficient stretchability and strength. Moreover, it has high elastic deformability and no yield point. Therefore, a film (sheet) obtained by forming the composition is particularly suitable as, for example, a substrate of an adhesive tape. That is, the adhesive tape using a substrate composed of a molded product of the resin composition of the present invention has winding workability, binding performance and hand-tearability identical to those of PVC tapes.

The winding workability and binding performance of an adhesive tape are affected by the initial elastic modulus, absence of yield point (being elastically deformable) and rupture strength of the resin composition as measured in a tensile test. The initial elastic modulus of the resin composition of the present invention in a tensile test is 50-300 MPa, preferably 100-250 MPa.

For an adhesive tape to show a good binding performance, it is also important that the resin composition constituting the substrate does not show any yield point and has high rupture strength. Whether or not the resin has a yield point can be determined by making a graph based on the output data of a tensile test. To determine the absence of a yield point, it is required that no decrease in the strength is observed from the graph, and the strength always increases as the resin composition is stretched. The resin composition of the present invention, in addition to having no yield point, has high rupture strength, i.e., a rupture strength of 12-30 MPa, preferably 14-26 MPa, more preferably 16-22 MPa.

For an adhesive tape to show good hand-tearability, it is necessary for the resin composition constituting the substrate to show sufficient stretchability. The resin composition of the present invention shows sufficient stretchability and an elongation at break of 200-1000%, preferably 250-850%, more preferably 300-700%.

The initial elastic modulus, rupture strength and rupture elongation herein mean the values measured when the resin composition of the present invention is formed into a sheet, and a test piece removed therefrom is stretched in an atmosphere of 23° C. and 50% RH by a tensile tester as defined in JIS B 7721 at a chuck distance of 50 mm and at a tensile rate of 300 mm/min.

PVC used for the PVC tapes is a non-crystalline polymer, showing high intermolecular interaction. Depending on the molecular weight and the amount of plasticizer added, the plasticizing temperature is generally about 120° C., and thus, the shape retention is sufficiently possible even at 100° C. The resin composition of the present invention shows a thermal deformation ratio at 100° C. of not more than 65%, preferably not more than 50%, more preferably not more than 40% in, for example, an adhesive tape having a substrate composed of the molded product of the composition. Addition of component C also has an effect of enhancing resistance to thermal deformation, and resistance to thermal deformation (ability to retain its shape at high temperatures) identical to or greater than that of PVC tapes can be obtained.

The resin composition of the present invention can be processed into a molded product having a desired shape for a desired use by a known forming method such as compression molding, calendar molding, injection molding, extrusion molding, and the like. Particularly, the resin composition of the present invention can be formed into a film (sheet) free of a defective appearance and having good operability by calendar molding because it has superior metal release property and superior flowability of molten product.

When the resin composition of the present invention is formed into a film (sheet) to give a tape substrate of an adhesive tape, the thickness of the film (sheet) is generally 0.01-1 mm, preferably 0.05-0.5 mm.

When a film (sheet) for a tape substrate of adhesive tapes is to be formed, it is preferable that the substrate not undergo, after film forming, a crosslinking treatment comprising an ionizing radiation such as electron beam, β-ray, γ-ray and the like, or a crosslinking treatment during a forming process, which comprises adding a crosslinking agent or a crosslinking aid such as organic peroxide etc. to the materials for forming the film.

An adhesive layer is formed on at least one side of a tape substrate obtained by forming the resin composition of the present invention to produce an adhesive tape. Examples of the adhesive include any existing adhesive, such as rubber type, hot melt type, acrylic type and emulsion type adhesives. Examples of the tackifier to be used for adhesives include rosin tackifier, terpene tackifier, aliphatic petroleum hydrocarbon ($C_5$) tackifier, aliphatic petroleum hydrocarbon ($C_9$) tackifier, hydrogenated compound and the like. It is also possible to add an additive usually added to the adhesive for an adhesive tape, such as oil, wax, antioxidant and the like in an amount determined by a conventional method.

The adhesive is applied by a conventionally-known method such as a cast method, a roll coater method, a reverse coater method, a doctor blade method, a die coater method and the like. The adhesive layer has a thickness (thickness after drying) that varies depending on the use of the adhesive tape, which is generally 10-50 μm, preferably 15-40 μm.

In the present specification, the weight average molecular weight and acid number are measurement values obtained according to the following methods.

1. Weight Average Molecular Weight
(a) Preparation of Sample

A sample (30 mg) was completely dissolved in o-dichlorobenzene (20 mL) at 145° C., and filtered through a sintered filter with 1.0 μm pore size. The solution after the filtration was used as a measurement sample, and the average molecular weight and molecular weight distribution curve were determined using GPC.

(B) Analysis Apparatus

Alliance GPC200 type manufactured by Waters Corporation (c) Measurement Conditions     column: $GMH_6$-HT(30 cm)×2/$GMH_6$-HTL(30 cm)×2 manufactured by TOSOH CORPORATION     column size: inner diameter 7.5 mm×length 300 mm (each column)

eluent: o-dichlorobenzene (0.025% BHT)

flow: 1.0 mL/min detector: differential refractometer (RI)

flow rate: 1.0 mL/min column temperature: 140° C.

injection volume: 500 μL sample concentration: 0.15% (w/v)

(Note) Molecular weight was calculated based on polystyrene.

2. Acid Number

The acid number was measured according to JISK0070 3.1, Neutralization Titration Method.

3. Melting Point

The melting point was measured according to JISK7121 4.2(2), Heart Current Speed Differential Scanning Calorimetry Method.

Hereinafter, the present invention is explained in more detail in the following by way of Examples. However, the present invention is not limited to the following Examples.

[Component A]

A1: ethylene-vinyl acetate copolymer (EVA) (trade name: ULTRATHENE 635, manufactured by Tosoh Corporation, melting point: 79° C., VA content: 25 wt %)

[Component B]

h-PP elastomer (trade name: AdflexQ200F, manufactured by SunAllomer Ltd., h-PP/EPR=30 wt %/70 wt %, melting point: 162° C.)

[Component C]

C1: modified polypropylene containing a maleic anhydride group (trade name: YOUMEX 1010, manufactured by Sanyo Chemical Industries, Ltd., Mw: 32,000, acid number: 52 mg KOH/g)

C2: modified polypropylene containing a maleic anhydride group (trade name: YOUMEX 1001, manufactured by Sanyo Chemical Industries, Ltd., Mw: 49,000, acid number: 26 mg KOH/g)

C3: unmodified low molecular weight polypropylene (trade name: VISCOL 440P, modified polypropylene, manufactured by Sanyo Chemical Industries, Ltd., Mw: 23,000, acid number: 0 mg KOH/g)

[Component D]

D1: magnesium hydroxide (average particle size: 0.8 μm) free of surface treatment     D2: magnesium hydroxide (average particle size: 0.8 μm) surface treated with vinyltriethoxysilane by a wet process in an amount capable of covering 100% of the surface.

D3: magnesium hydroxide (average particle size: 0.8 μm) surface treated with methacryloxysilane by a wet process in an amount capable of covering 100% of the surface.

D4: magnesium hydroxide (average particle size: 0.8 μm) surface treated with γ-aminopropyltriethoxysilane by a wet process in an amount capable of covering 100% of the surface.

The materials shown in the following Tables 1 and 2 in the amounts indicated therein were used as component A, component B, component C and component D, a composition was prepared according to the following production method. The composition was further formed into a film (Examples 1-3, Comparative Examples 1-5).

[Preparation of Resin Composition and Formation of Film]

Figure 1:
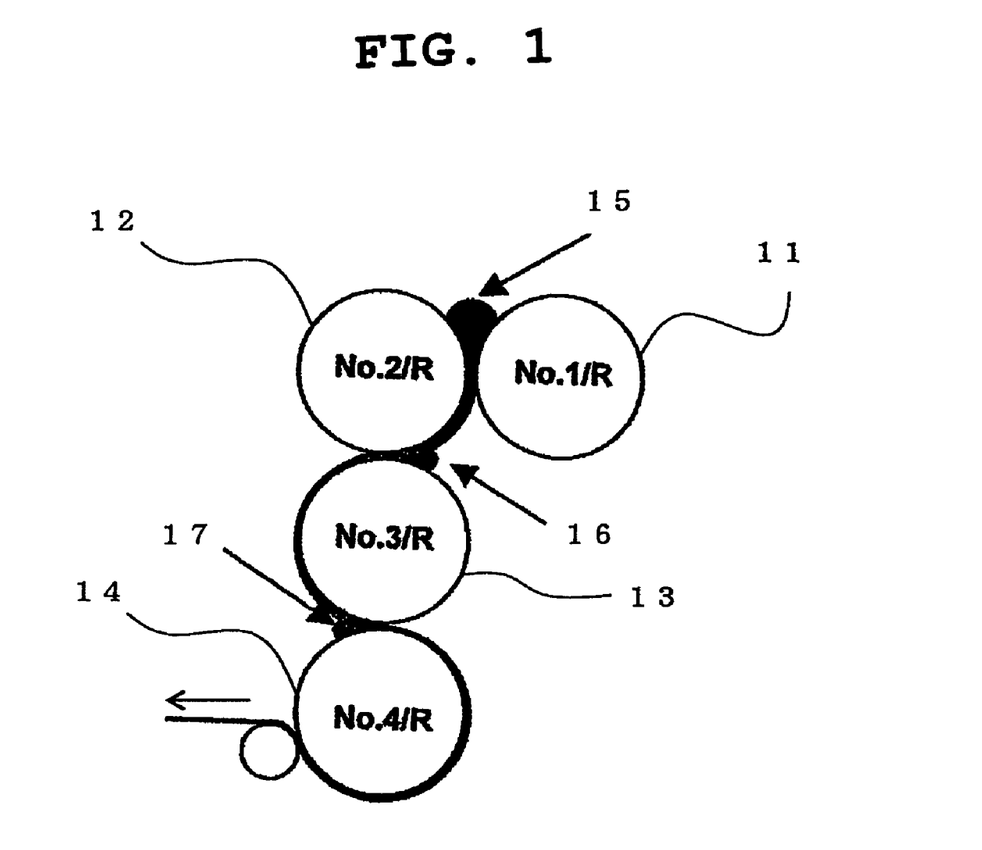
FIG. 1 is a schematic diagram of an inverted 4 L type calendar.

Each material shown in the following Table 1 was kneaded in a banbury mixer to give a blend. Then, the blend was formed into a film having a thickness of 0.10 mm by a calendar rolling machine with an inverted 4 L type calendar. FIG. 1 shows a schematic diagram of the inverted 4 L type calendar. The symbols 11-14 in the Figure show calendar rolls (11: roll No. 1, 12: roll No. 2, 13: roll No. 3, 14: roll No. 4), and symbols 15-17 show banks by the formed materials.

[Formability Evaluation]

(a) Roll Release Property

The release property of the film from roll No. 4 (see FIG. 1) was visually observed and evaluated in 3 levels.

○: good release property

Δ: somewhat bad release property x: bad release property and film forming was difficult (b) Bank Rotation The state of the respective banks 15-17 in the inverted 4 L type calendar (see FIG. 1) was visually observed and evaluated in 3 levels.

○: good bank rotation

Δ: slightly disturbed x: almost no bank rotation

Generally, in film forming by a calendar method, the thickness of a blend (material to be formed) is reduced to a predetermined level by narrowing the distance between rolls step by step. Therefore, a part of the blend always resides during passage between respective rolls and, at that time, a flow that enters the gap between rolls and a flow that failed to enter the gap and go backward are produced. Due to this action, the blend in the bank rotates. When the supply amount of the blend from the upper part and the amount of the blend to be discharged are the same, the size (amount) and rotation of the bank are stabilized, and the thickness and width of the blend that passed through the gap between rolls are also maintained stable. Therefore, when the circulation in the bank (i.e., bank rotation) is not stabilized, the balance between the supply and discharge of the blend is disturbed for some reason, and the shape of the film formed becomes unstable.

[Property Evaluation]

(1) Tensile Test

A film obtained by forming was cut (size: width 19 mm×length 150 mm) to give a test piece. Under the atmosphere of 23° C., 50% RH, the test piece was pulled at a chuck distance of 50 mm and a tensile rate of 300 mm/min using a tensile tester defined in JIS B 7721 (AG-20KNG, manufactured by SHIMADZU CORPORATION) and the initial elastic modulus, rupture strength and rupture elongation were measured. In addition, the presence or absence of the yield point was confirmed based on the measurement output graph.

(2) Surface Roughness

The average roughness (Ra) of the center line of the release surface from the roll No. 4 of the above-mentioned test piece (see FIG. 1) was measured.

For the measurement, a contact type surface roughness measuring meter P-15 (trade name KLA-Tencor, manufactured by KLA-Tencor Corporation) and the following conditions were used.

Scan length: 10,000 mm

Scan speed: 400 μm/s

Sampling rate: 200 Hz

Stylus force: 5 mg.

(3) Thermal Deformation Rate

The film obtained by forming was used as a substrate for an adhesive tape. A corona discharge treatment was applied to one side of the substrate for an adhesive tape, and an acrylic adhesive was applied (thickness 0.025 mm) to give an adhesive tape.

Figure 2:
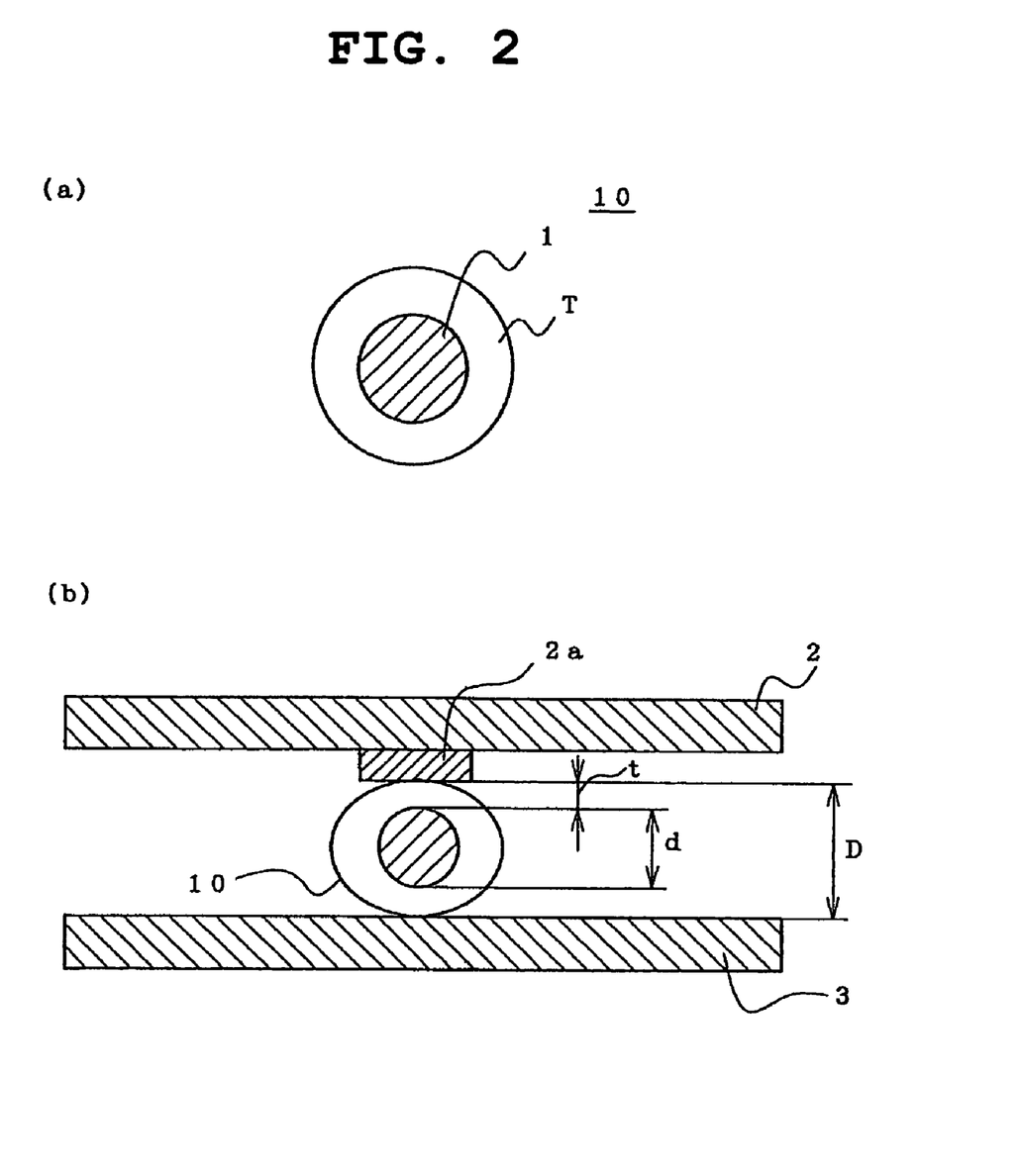
FIG. 2 shows an explanation of a method of evaluation test of thermal deformation rate of an adhesive tape, wherein FIG. (a) is a side view of the test sample and FIG. (b) is a side view of a test apparatus.

As shown in FIG. 2(a), a test sample 10 was prepared by winding an adhesive tape T around the outer circumference of a is round rod 1 made of a conductor and having a diameter (d) of 2 mm, to a thickness (t) of the adhesive tape T of 0.8 mm. The outer diameter ($D_o$) of the test sample 10 was measured at ambient temperature with a dial gauge defined in JIS B7503, a caliper square defined in JIS B7507, or a measurement tool having similar measurement precision to give the test sample 10 having a total thickness of 3.6±0.5 mm. Then, the test sample 10 was placed in a tester heated to a defined temperature (100.0±1.0° C.). After heating for 60 min, the test sample 10 was set between a pressure plate 2 with a stopper 2a (diameter 9.5±0.2 mm) and a parallel plate 3 of the test apparatus, and pressurized by applying a defined weight (4.90 N) from the perpendicular direction relative to the flat plane of the plate, as shown in FIG. 2(*b*). After leaving the sample for 60 min at a defined temperature (100.0±1.0° C.), the outer diameter of the test sample ($D_1$) was measured as was, and the thickness of the tape before heating ($t_0$) and that after heating ($t_1$) were calculated according to the following formula (I). A decrease rate (thermal deformation rate) (X) of the thickness of the tape before heating to that after heating was calculated according to the following formula (II).

<Evaluation Criteria>

A decrease rate (thermal deformation rate) (X) of 65% or below passes and of more than 65% fails.

$$t=(D-d)/2 \quad (I)$$

wherein D is an outer diameter of the test subject, and d is a diameter of a round rod.

$$X(\%)=((t_0-t_1)/t_0)\times 100 \quad (II)$$

wherein $t_0$ is a thickness (mm) before heating, and $t_1$ is a thickness (mm) after heating.

ity comparable to those of PVC tapes, can be produced by the use of the formed film as a substrate of the adhesive tape.

In contrast, resin compositions of Comparative Examples 1-5 without component C (low molecular weight modified polyolefin polymer containing an acidic functional group) show poor molding processability. As a result, a molded product with small surface roughness and good appearance cannot be achieved. In addition, the resin compositions of Comparative Examples 1-5 mostly show poor elastic deformation with a yield point, and when prepared into a composition showing comparatively good elastic deformation free of a yield point (Comparative Example 5), the molding processability is markedly degraded and the surface roughness of the molded product becomes extremely large.

This application is based on a patent application No. 2007-108278 filed in Japan, the contents of which are incorporated in full herein by this reference.

The invention claimed is:

1. An adhesive tape substrate composed of a molded product of a flame-retardant polyolefin resin composition, which is not cross-linked during or after a forming process thereof, wherein the flame-retardant polyolefin resin composition comprises the following components A-D and is substantially free of a halogen atom:

component A: a thermoplastic resin of at least one member selected from the group consisting of an ethylene-ethyl acrylate copolymer and an ethylene-vinyl acetate copolymer;

component B: a polymer alloy of homopolypropylene (h-PP) and ethylene-propylene rubber (EPR) or a polymer alloy of random polypropylene and ethylene-propylene rubber (EPR);

TABLE 1

| | material name | | Comp. Ex. 1 | Ex. 1 | Comp. Ex. 2 | Ex. 2 | Comp. Ex. 3 | Ex. 3 | Comp. Ex. 4 | Comp. Ex. 5 |
|---|---|---|---|---|---|---|---|---|---|---|
| Component A | EVA (VA content: 25 wt %, melting point: 79° C.) | | 45 | 45 | 45 | 45 | 45 | 45 | | 45 |
| Component B | PP elastomer (h-pp/EPR = 30/70) | | 55 | 50 | 55 | 52 | 55 | 52 | 50 | 55 |
| Component C | anhydrous maleic acid modified PP (acid number 52, Mw 32,000) | | | 5 | | 3 | | | | |
| | anhydrous maleic acid modified PP (acid number 26, Mw 49,000) | | | | | | | | 3 | |
| | unmodified PP (acid number 0, Mw 33,000) | | | | | | | | | 5 |
| Component D | D1 Mg(OH)$_2$ | untreated | 100 | 100 | | | | | | |
| | D2 Mg(OH)$_2$ | vinylsilane treatment | | | 100 | 100 | | | 100 | |
| | D3 Mg(OH)$_2$ | methacryloxysilane treatment | | | | | 100 | 100 | | |
| | D4 Mg(OH)$_2$ | aminosilane treatment | | | | | | | | 100 |
| workability | calendar film forming | roll release property | ○ | ○ | ○ | ○ | ○ | ○ | △ | X |
| | | bank rotation | X | ○ | △ | ○ | △ | ○ | ○ | X |
| properties | yield point | | yes | none | yes | none | yes | none | yes | none |
| | intensity (MPa) | | 16 | 17 | 17.5 | 18.4 | 18.2 | 19.1 | 14.9 | 20 |
| | elongation (%) | | 520 | 480 | 680 | 630 | 600 | 590 | 610 | 320 |
| | surface roughness Ra(μm) | | 2 | 1.3 | 2.1 | 1.4 | 2.2 | 1.5 | 1.2 | 2.5 |
| | thermal deformation rate (%) | | 30 | 25 | 32 | 27 | 33 | 29 | 30 | 35 |

From Table 1, the resin compositions of Examples 1-3 containing all components A-D have superior molding processability, and afforded flame-retardant molded products having a small surface roughness and a good appearance. Moreover, since they have superior resistance to thermal deformation and suitable stretchability and intensity, as well as mechanical property rich in elastic deformation, a flame-retardant adhesive tape with a good appearance, which shows winding workability, binding performance and hand-tearabilcomponent C: a modified polypropylene which is obtained by grafting a maleic anhydride on an unmodified polypropylene and having a weight average molecular weight of 10,000-80,000 and an acid value of 20-60 mg KOH/g;

component D: an inorganic metal compound; and wherein the mixing weight ratio of component A, component B and component C (component A:component B:component C) is 10-60:89-30:1-10.

2. The adhesive tape substrate of claim 1, wherein the inorganic metal compound of the component D is a metal hydroxide.

3. The adhesive tape substrate of claim 1, comprising 20-200 parts by weight of component D per 100 parts by weight of the total amount of component A, component B and component C.

4. An adhesive tape comprising the adhesive tape substrate of claim 1.

5. The adhesive tape of claim 4, having a thermal deformation rate of not more than 65% at 100° C.

6. The adhesive tape substrate of claim 1, wherein the thermoplastic resin of component A is an ethylene-vinyl acetate copolymer.

* * * * *